United States Patent
Mehr

[11] Patent Number: 5,257,598
[45] Date of Patent: Nov. 2, 1993

[54] FUEL AND WATER VAPORIZER FOR AN ENGINE

[76] Inventor: Fred Mehr, P.O. Box 1117, Hilo, Hi. 96712

[21] Appl. No.: 921,073

[22] Filed: Jul. 29, 1992

[51] Int. Cl.⁵ .............................................. F02B 47/00
[52] U.S. Cl. ................................. 123/25 B; 123/337; 123/556; 261/120
[58] Field of Search ............... 123/523, 524, 555, 556, 123/25 B, 25 D, 337, 559.1; 261/119.2, 120

[56] References Cited
U.S. PATENT DOCUMENTS

| | | | |
|---|---|---|---|
| 546,815 | 9/1895 | Hain | 261/120 |
| 4,003,969 | 1/1977 | Robinson | 123/25 B |
| 4,438,745 | 3/1984 | Watanabe | 123/337 |
| 5,121,713 | 6/1992 | Peterson | 123/25 B |

*Primary Examiner*—Noah P. Kamen
*Attorney, Agent, or Firm*—Michael I. Kroll

[57] ABSTRACT

The present invention is a device for aborting liquid fuel waste causing pollution. The device for aborting liquid fuel waste causing pollution includes an engine, a control valve connected to the engine, intake for the engine, a line for supplying burning mist vapor to the control valve that is connected to the engine.

20 Claims, 1 Drawing Sheet

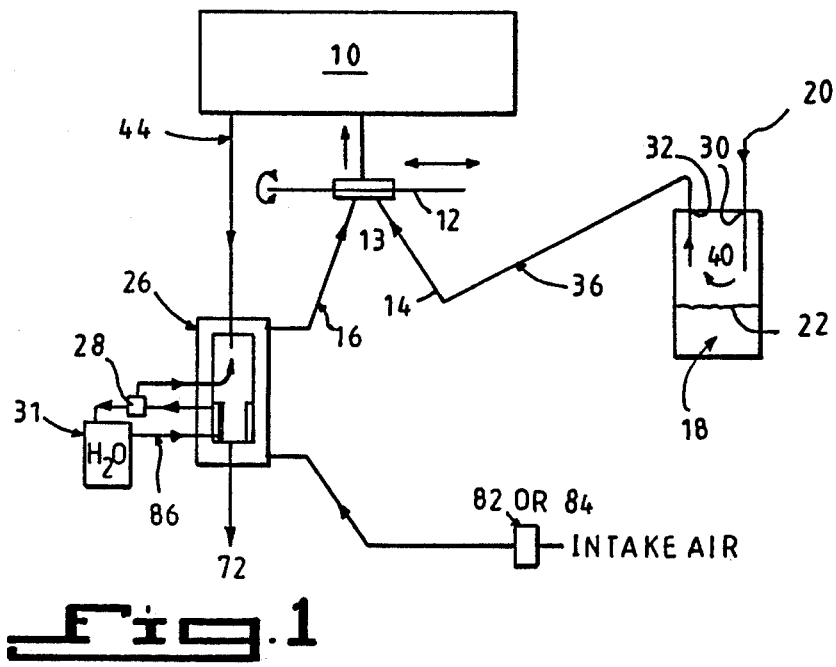
_Fig.1_
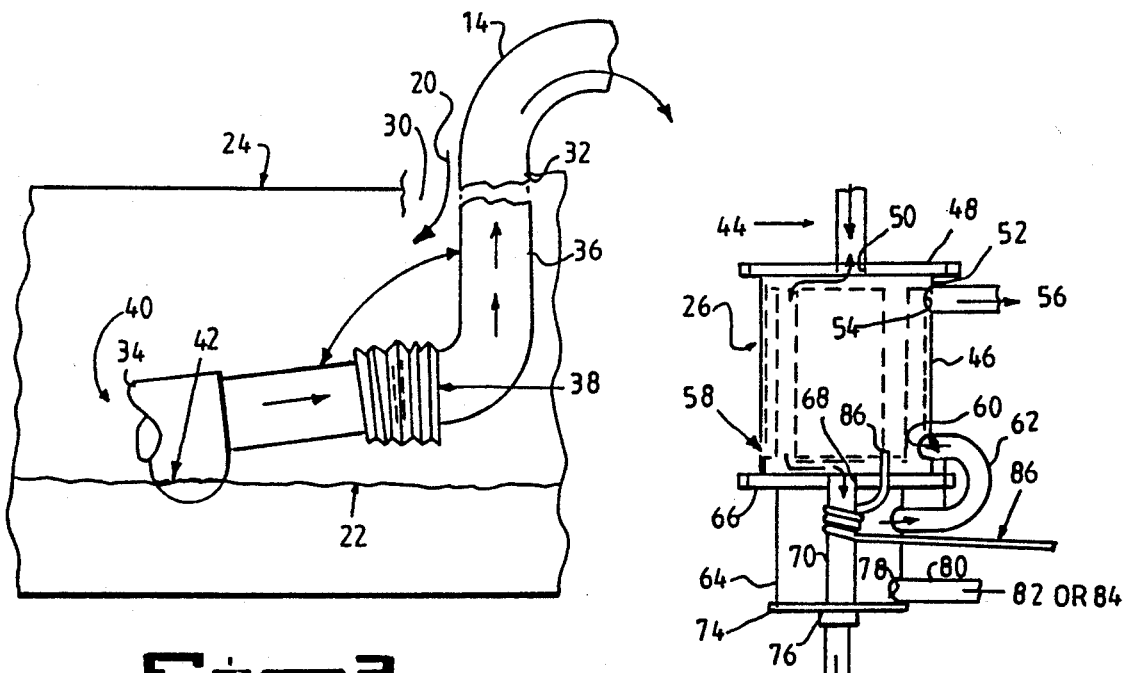
_Fig.2_   _Fig.3_

FUEL AND WATER VAPORIZER FOR AN ENGINE

BACKGROUND OF THE INVENTION

1. Field of the Invention

The present invention relates to an engine.

More particularly, the present invention relates to an engine that runs on water and gas.

2. Description of the Prior Art

Many devices like carburetors, injectors, and turbo wheels have been pushed to their limits to try to solve the problems that exist in ignorance of a simple time factor. A chemical process has a hitch hiker called "time" that is needed to complete the change for the burning or an explosion. This truth is a wall that separates a complete change in engines to use all the energy without pollution and loss of efficiency.

Using engines with the modern fast cycle which can be installed in the intake manifold or adjoining it, reduces the needed time to complete the combustion of all the gas and air mixture to a vapor state, similar to domestic propane in home use to 15-30 sec.

The reason to distinguish domestic use is the time needed to complete burning or exploding the gas mixture in an engine with a carburetor, has failed for propane engines. The cold air is added to the gas without the time needed for mating. Air by itself will not burn. In experimental tryouts, it was found that more time was needed and vital for completion of usage.

Radial engines have no time exemption to having the little hitch hiker "time" in the process of complete burning of fuel, therefore it will also have its preliminary time consideration.

Liquid propane is bought and kept in tanks outdoors, never filled completely, reason was that when used only, propane vapor comes into the utilities for the home, with an efficiency of 99%.

The ultimate difference is the time that is allotted to burn the fuel. There are several events that take place in burning or exploding. When using the fast cycle, time is added to the fuel by making it a dry gas before it enters the combustion cylinder.

There is no heat in the engine and one could hold a bare hand on the muffler, simulating an auto hook-up. The present invention will run with no carburetor, just a control valve for the air and dry gas mixture.

Numerous innovations for engines have been provided in the prior art that are adapted to be used. Even though these innovations may be suitable for the specific individual purposes to which they address, they would not be suitable for the purposes of the present invention as heretofore described.

SUMMARY OF THE INVENTION

Accordingly, it is an object of the present invention to provide a device for aborting liquid fuel waste causing pollution that avoids the disadvantages of the prior art.

More particularly, it is an object of the present invention to provide a device whose dual fuel system is far less dangerous than systems using a hydrogen storage tank. In the present invention the hydrogen is not stored, just made and used. Hydrogen has an affinity to go with carbon in air gas state for burning. The thermostat admission of $H_2O$ at 190° into the unit, to go into dry gas for use as fuel which can be mobilized by either gravity or a pump system.

In keeping with these objects, and with others which will become apparent hereinafter, one feature of the present invention resides, briefly stated, in a device for aborting liquid fuel waste causing pollution and including an engine; a control valve connected to the engine, intake means for the engine, first means for supplying burning mist vapor to the control valve that is connected to the engine, second means for supplying water and hot air to the control valve which is connected to the engine, and third means for emanating water to the second means.

In accordance with another feature of the present invention, the control valve moves from side to side and revolves.

Another feature of the present invention is that the intake means for the engine is via two lines that enter the control valve.

Yet another feature of the present invention is that one line is a ¾" ID pipe that contains fumes only.

Still another feature of the present invention is that the fumes emanate from a tank.

Yet still another feature of the present invention is that the tank contains liquid gasoline.

Still yet another feature of the present invention is that the other line is a 1" ID pipe.

Another feature of the present invention is that the other pipe contains water and hot air.

Yet another feature of the present invention is that it further comprises an $H_2O$ Vapor/Hot air System.

Still another feature of the present invention is that the pipe that contains the water and hot air receives it from the $H_2O$ Vapor/Hot Air System.

Yet still another feature of the present invention is that it further comprises an auxiliary fan.

Still yet another feature of the present invention is that it further comprises an air pump.

Another feature of the present invention is that the $H_2O$ Vapor/Hot air System is operated by the auxiliary fan via a 1" pipe.

Yet another feature of the present invention is that the $H_2O$ Vapor/Hot Air System is operated by the air pump via a 1" pipe.

Still another feature of the present invention is that it further comprises a thermostat.

Yet still another feature of the present invention is that the $H_2O$ Vapor/Hot Air System is kept at 190° by the thermostat.

Still yet another feature of the present invention is that it further comprises a water tank.

Another feature of the present invention is that the $H_2O$ Vapor/Hot Air System contains a cylindrical shaped body with an upper plate and a lower plate, and a lower portion connected to the lower plate of the cylindrical body.

Still another feature of the present invention is that a liquid gasoline tank is a rectangular shaped body containing a low level of liquid gasoline while the remaining space contains burning mist vapor.

Yet still another feature of the present invention is that the first means is a pipe that enters the liquid gasoline tank.

Still yet another feature of the present invention is that the portion of the pipe that remains within the liquid gasoline tank contains a flexible connector.

Another feature of the present invention is that the flexible connector is of the accordion type.

Yet another feature of the present invention is that the pipe, whose end is within the liquid gasoline tank, contains an open end surrounded by buoyant material.

The novel features which are considered characteristic for the invention are set forth in particular in the appended claims. The invention itself, however, both as to its construction and its method of operation, together with additional objects and advantages thereof, will be best understood from the following description of the specific embodiments when read in connection with the accompanying drawing.

BRIEF DESCRIPTION OF THE DRAWING

FIG. 1 is a schematic of the present invention;
FIG. 2 is a side view of the liquid gasoline tank; and
FIG. 3 is a side view of the H$_2$O Vapor/Hot Air System.

DETAILED DESCRIPTOIN OF THE PREFERRED EMBODIMENT

Referring to FIGS. 1 and 2, an engine 10 receives its intake via a control valve 12.

The control valve 12 moves side to side and can revolve.

Intake 13, of the control valve 12, is by two lines 14 and 16. The line 14 is a ¾" ID pipe that contains fumes only. The fumes 40 come from a liquid gasoline tank 18.

The liquid gasoline tank 18 has an outside air intake 20, which admits air, that mixes with internal liquid gasoline 22. This allows the liquid gasoline tank 18 can exhaust only burning mist vapor 40.

The line 16 is a 1" pipe that contains water and hot air. The line 16 receives the water and the hot air from an H$_2$O Vapor/Hot Air System 26. The H$_2$O Vapor/Hot Air System 26 generates the water and the hot air. The H$_2$O Vapor/Hot Air System 26 and the hot air system are operated by an auxiliary fan 84 or air pump 82 which receives air and the hot exhaust gas 44 from the engine 10, via a 1" ID pipe.

Also entering the H$_2$O Vapor/Hot Air System 26 is dry gas kept at 190° by a thermostat 28.

The H$_2$O used to produce the dry gas emanates from a water tank 31.

Structure of the liquid gasoline tank 18 includes two orifices in its tank top 24. The first orifice 30, allows the outside air intake 20 to enter the liquid gasoline tank 18. The second orifice 32, allows the line 14 to enter the liquid gasoline tank 18, by its end 34, while the line 14 proper produces a snorkel air inlet system 36 on its mission to the previously mentioned control valve 12.

The line 14 contains a flexible connector 38, after entering the liquid gasoline tank 18. The flexible connector 38 is of the accordion type. At the end 34 of the line 14, that is in the liquid gasoline tank 18, is disposed a buoyancy material 42 which prevents the end 34 from dropping into the liquid gasoline 22, and keeping the end 34 open to the vapors 40.

The structure of the H$_2$O Vapor/Hot Air System 26, is shown in FIG. 3. The body 46 of the H$_2$O Vapor/Hot Air System 26 is basically cylindrical. At its top plate 48 is centrally located an orifice 50 which permits the 1" ID hot exhaust gas 44 from the engine 10 to enter the body 46 of the HG$_2$O Vapor/ Hot Air System 26. At the most upper point 52 of the body 46 is another orifice 54 which mates with line 16 and which carries the water and hot air mixture 56.

At the lower most point of the body 46 are two more orifices 58 and 60. The first orifice 58 is a blow off opening for any minor excess air and water, if present. The second orifice receives line 62 which connects the lower portion 64 to the body 46.

At its bottom plate 66 is centrally located an orifice 68 having an exhaust outlet 70 passing through the lower portion 64 and carrying off the exhaust 72.

At the bottom plate 74 of the lower portion 64 is a centrally located orifice 76 which the exhaust outlet 70 passes therethrough.

At the lower most point of the lower body 64 is an orifice 78. A 1" line 80 is connected to the orifice 78 and carries fresh air from engine fan 84 or air pump 82.

A ⅛" tube 86 is wrapped around the line 70 whose portion is in the lower portion 64, and is used for preheating. Its first end originates from the water tank 31 while the other end enters the main body 46.

It will be understood that each of the elements described above, or two or more together, may also find a useful application in other types of constructions differing from the type described above.

While the invention has been illustrated and described as embodied in a device for aborting liquid fuel waste causing pollution engine, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A device for aborting liquid fuel waste causing pollution, comprising:
   a) an engine;
   b) a liquid gasoline tank containing an internal portion of a pipe and an external portion of said pipe and an air inlet system;
   c) a control valve connected to said engine;
   d) intake means for said engine;
   e) first means for supplying vapor and air, that can burn, to said control valve that is connected to said engine, said first means being a pipe that enters said liquid gasoline tank, said portion of said pipe that remains within said liquid gasoline tank contains a flexible connection on said said inlet system, said flexible connection is of the accordion type so that said portion of said pipe that remains within said liquid gasoline tank can rise and drop so as to always be at the gasoline level without effecting the position of said external portion of said pipe;
   f) second means for supplying water and hot air to said control valve which is connected to said engine; and
   g) third means for emanating water to said second means.

2. A device as defined in claim 1, wherein said control valve moves from side to side and revolves.

3. A device as defined in claim 1, wherein said intake means for said engine is from said control valve which has two lines entering it.

4. A device as defined in claim 3, wherein one line is a ¾" ID pipe that contains fumes only.

5. A device as defined in claim 4, wherein said gasoline tank contains liquid gasoline.

6. A device as defined in claim 5, wherein aid $H_2O$ Vapor/Hot Air system contains a cylindrical shaped body with an upper plate and a lower plate and a lower portion connected to said lower plate that is attached to said cylindrical body.

7. A device as defined in claim 3, wherein the other line is a 1" ID pipe.

8. A device as defined in claim 7, wherein said pipe contains water and hot air.

9. A device as defined in claim 8, wherein said pipe that contains said water and hot air receive it from said $H_2O$ Vapor/Hot Air System.

10. A device as defined in claim 8; further comprising an $H_2O$ Vapor/Hot Air System.

11. A device as defined in claim 10, wherein an air pump is included.

12. A device as defined in claim 10, wherein an auxiliary fan is included.

13. A device as defined in claim 12, wherein said $H_2O$ Vapor/Hot Air System is fed by said auxiliary fan via a 1" pipe.

14. A device as defined in claim 12, wherein said $H_2O$ Vapor/Hot Air System is fed by said air pump via a 1" pipe.

15. A device as defined in claim 14, wherein a thermostat is included.

16. A device as defined in claim 14, wherein said $H_2O$ Vapor/Hot Air System is kept at 190° by said thermostat.

17. A device as defined in claim 16, wherein a water tank is included.

18. A device as defined in claim 1, wherein said gasoline tank contains liquid gasoline.

19. A device as defined in claim 18, wherein said liquid gasoline tank is rectangularly shaped and contains a low level liquid gasoline and the remaining space contains burning mist vapor.

20. A device as claimed in claim 19 wherein said pipe whose end is within the liquid gasoline tank contains an open end surrounded by buoyant material.

* * * * *